Figure 1:
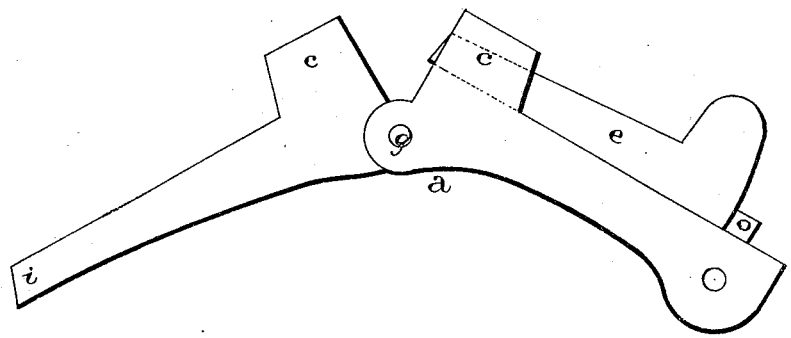
Figure 2:
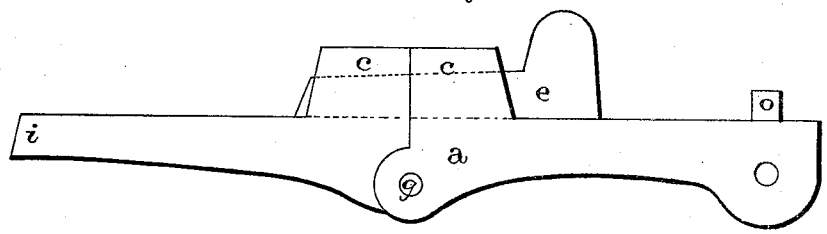

A. C. McEWEN.
Pawls.

No. 149,237.

Patented March 31, 1874.

WITNESSES.
Edwd. Kaiser.
J. Wm. Garner.

INVENTOR.
A. C. McEwen
per
F. A. Lehmann, Atty.

UNITED STATES PATENT OFFICE.

ADDISON C. McEWEN, OF RUTHERFORD PARK, NEW JERSEY.

IMPROVEMENT IN PAWLS.

Specification forming part of Letters Patent No. 149,237, dated March 31, 1874; application filed March 16, 1874.

*To all whom it may concern:*

Be it known that I, A. C. McEWEN, of Rutherford Park, in the county of Bergen and State of New Jersey, have invented certain new and useful Improvements in Pawls; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in pawls; and it consists in making the pawl in two parts, which are hinged or pivoted together, and provided with a sliding bolt or other locking device, so that the two parts can be locked rigidly in line, or the bolt can be moved backward so as to allow the pawl to be bent or doubled upward at the joint, thereby releasing the forward end from the cogs of the wheel, as will be more fully described hereafter.

The accompanying drawings represent my invention.

$a$ represents an ordinary pawl to be used in connection with ratchets of all kinds, and which is formed of two parts pivoted or hinged together at any desired point. Upon the top of each part is a guide or boss, $c$, through which a sliding bolt, $e$, moves back and forth, so as to lock the two parts of the pawl rigidly in line, or which can be moved backward to allow the pawl to be bent upward at the pivot or hinge $g$, so as to release the point $i$ from the teeth of the wheel. In order to prevent the bolt from falling out and being lost, a stud or projection, $o$, is formed on one of the parts, against which the rear end of the bolt strikes.

Frequently, and especially so in heavy machinery, the back action of the ratchet catches the end of the pawl and holds it so tightly that it is impossible to release it until the wheel is pried forward or the engine started, thus causing much inconvenience and loss of time.

By means of my device this trouble is entirely done away with.

This pawl is intended especially for ferry-boats, where, after the holding-chains have once been tightly wound around the windlass, there is nearly always delay and trouble in releasing the pawl.

Having thus described my invention, I claim—

A pawl made in two parts, and provided with a locking device, substantially as shown and described.

In testimony that I claim the foregoing I have hereunto set my hand this 2d day of March, 1874.

ADDISON C. McEWEN.

Witnesses:
 F. A. LEHMANN,
 W. W. J. MURPHY.